(12) United States Patent
Sasaki et al.

(10) Patent No.: US 11,928,403 B2
(45) Date of Patent: Mar. 12, 2024

(54) OPTIMIZATION APPARATUS AND OPTIMIZATION METHOD FOR ANNEALING CIRCUITS

(71) Applicant: FUJITSU LIMITED, Kawasaki (JP)

(72) Inventors: Masato Sasaki, Kawasaki (JP); Satoshi Matsuura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 512 days.

(21) Appl. No.: 17/192,929

(22) Filed: Mar. 5, 2021

(65) Prior Publication Data
US 2021/0192109 A1    Jun. 24, 2021

Related U.S. Application Data

(63) Continuation of application No. PCT/JP2018/034000, filed on Sep. 13, 2018.

(51) Int. Cl.
*G06F 30/20* (2020.01)
*G06F 5/01* (2006.01)
(Continued)

(52) U.S. Cl.
CPC ............... *G06F 30/20* (2020.01); *G06F 5/01* (2013.01); *G06F 7/485* (2013.01); *G06F 2119/08* (2020.01)

(58) Field of Classification Search
CPC ............ G06F 30/20; G06F 5/01; G06F 7/485; G06F 2119/08; G06F 2111/08; G06F 2111/10; G06N 5/01
See application file for complete search history.

(56) References Cited

U.S. PATENT DOCUMENTS

2016/0118106 A1    4/2016    Yoshimura et al.
2018/0005114 A1    1/2018    Tomita et al.

FOREIGN PATENT DOCUMENTS

JP    H05-250346 A    9/1993
JP    H09-231197 A    9/1997
(Continued)

OTHER PUBLICATIONS

E.B. Schlünz, J.H. van Vuuren, An investigation into the effectiveness of simulated annealing as a solution approach for the generator maintenance scheduling problem, International Journal of Electrical Power & Energy Systems, vol. 53, 2013, pp. 166-174. (Year: 2013).*

(Continued)

*Primary Examiner* — Eunhee Kim
(74) *Attorney, Agent, or Firm* — Fujitsu Intellectual Property Center

(57) ABSTRACT

An optimization apparatus includes electronic circuits configured to perform calculating, for a plurality of annealing units to which respective states and respective, different temperatures are assigned, respective evaluation function values responsive to the respective states, and causing a transition in the states with probabilities responsive to the temperatures and the evaluation function values, exchanging the temperatures or the states between the plurality of annealing units with predetermined probabilities based on the temperatures and the evaluation function values, and changing a temperature of an annealing unit of interest, such that a probability of exchange between the annealing unit of interest and a first annealing unit situated next thereto on a lower temperature side in a sequence arranged in order of temperature approaches a probability of exchange between the annealing unit of interest and a second annealing unit (Continued)

situated next thereto on a higher temperature side in the sequence.

8 Claims, 12 Drawing Sheets

(51) Int. Cl.
*G06F 7/485* (2006.01)
*G06F 119/08* (2020.01)

(56) References Cited

FOREIGN PATENT DOCUMENTS

JP 2018-005541 A 1/2018
WO 2014/192153 A1 12/2014

OTHER PUBLICATIONS

Po-Han Chen, Seyed Mohsen Shahandashti, Hybrid of genetic algorithm and simulated annealing for multiple project scheduling with multiple resource constraints, Automation in Construction, vol. 18, Issue 4, 2009, pp. 434-443. (Year: 2009).*

Li, Yaohang et al., "Hybrid parallel tempering and simulated annealing method", Applied Mathematics and Computation, Elsevier, US, vol. 212, No. 1, Jun. 1, 2009, pp. 216-228, XP026085856, ISSN: 0096-3003, DOI: 10.1016/J.AMC.2009.02.023 [retrieved on Mar. 10, 2009].

Swendsen, Robert H. et al., "Replica Monte Carlo Simulation of Spin-Glasses ", Nov. 24, 1986, pp. 2607-2609, XP055918593, DOI: 10.1103/PhysRevLett.57.2607.Source:Retrieved from the Internet:URL: https://www.researchgate.net/profile/Robert_Swendsen/publication/13255490_Replica_Monte_Carlo_Simulation_of_Spin-Glasses/inks/0046352309b5f54715000000.pdf [retrieved on May 6, 2022].

Extended European Search Report dated May 17, 2022 for corresponding European Patent Application No. 18933723.1, 12 pages.

Koji Fukushima(Hukushima), "Recent Developments in Markov-chain Monte Carlo Method", The Institute of Electronics, Information and Communication Engineers, IEICE Technical Report, Jun. 7, 2010, vol. 110, pp. 113-116 (Total 6 pages) (Cited in ISR).

International Search Report and Written Opinion of the International Searching Authority (Form PCT/ISA/210 and 237), mailed in connection with PCT/JP2018/034000 and dated Dec. 18, 2018 (Total 8 pages).

* cited by examiner

FIG.5

| REPLICA SEQUENCE NUMBER (0~15) | TEMPERATURE SEQUENCE NUMBER (0~15) |
|---|---|
| 0 | TEMPERATURE SEQUENCE NUMBER 0 |
| 1 | TEMPERATURE SEQUENCE NUMBER 1 |
| 2 | TEMPERATURE SEQUENCE NUMBER 2 |
| 3 | TEMPERATURE SEQUENCE NUMBER 3 |
| 4 | TEMPERATURE SEQUENCE NUMBER 4 |
| 5 | TEMPERATURE SEQUENCE NUMBER 5 |
| 6 | TEMPERATURE SEQUENCE NUMBER 6 |
| 7 | TEMPERATURE SEQUENCE NUMBER 7 |
| 8 | TEMPERATURE SEQUENCE NUMBER 8 |
| 9 | TEMPERATURE SEQUENCE NUMBER 9 |
| 10 | TEMPERATURE SEQUENCE NUMBER 10 |
| 11 | TEMPERATURE SEQUENCE NUMBER 11 |
| 12 | TEMPERATURE SEQUENCE NUMBER 12 |
| 13 | TEMPERATURE SEQUENCE NUMBER 13 |
| 14 | TEMPERATURE SEQUENCE NUMBER 14 |
| 15 | TEMPERATURE SEQUENCE NUMBER 15 |

FIG.6

| TEMPERATURE SEQUENCE NUMBER (0~15) | THERMODYNAMIC BETA (FLOATING-POINT) |
|---|---|
| 0 | TEMPERATURE A |
| 1 | TEMPERATURE B |
| 2 | TEMPERATURE C |
| 3 | TEMPERATURE D |
| 4 | TEMPERATURE E |
| 5 | TEMPERATURE F |
| 6 | TEMPERATURE G |
| 7 | TEMPERATURE H |
| 8 | TEMPERATURE I |
| 9 | TEMPERATURE J |
| 10 | TEMPERATURE K |
| 11 | TEMPERATURE L |
| 12 | TEMPERATURE M |
| 13 | TEMPERATURE N |
| 14 | TEMPERATURE O |
| 15 | TEMPERATURE P |

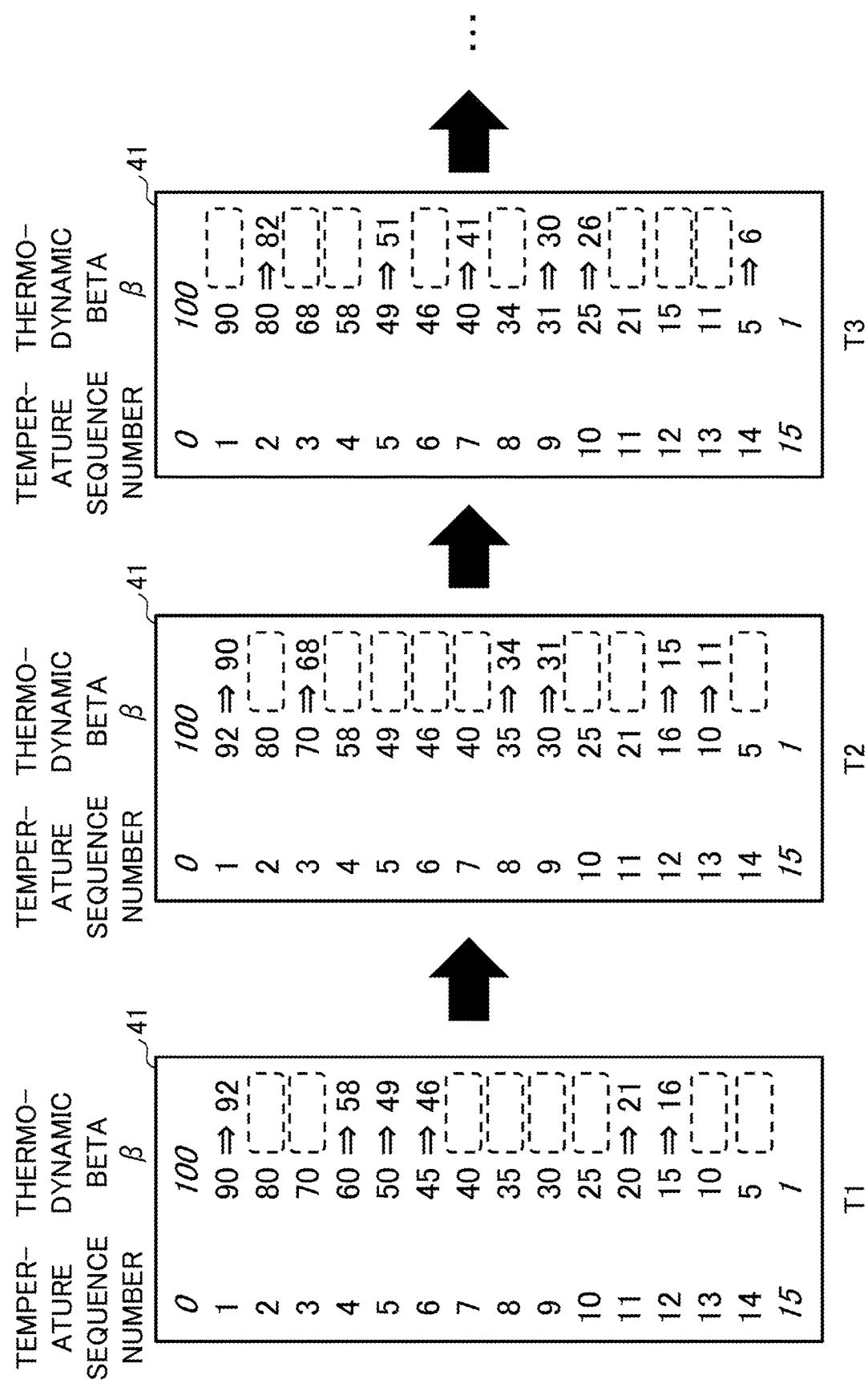

OPTIMIZATION APPARATUS AND OPTIMIZATION METHOD FOR ANNEALING CIRCUITS

CROSS-REFERENCE TO RELATED APPLICATIONS

This application is a continuation application of International Application PCT/JP2018/034000 filed on Sep. 13, 2018, and designated the U.S., the entire contents of which are incorporated herein by reference.

FIELD

The disclosures herein relate to an optimization apparatus and a method of controlling an optimization apparatus.

BACKGROUND

An optimization problem is the problem of finding a point (i.e., solution) belonging to search space that minimizes the value of an objective function defined in the search space. When the search space is a discrete set having a finite number of elements, the minimum value can be found in an exhaustive manner by comparing objective function values that are calculated at all the points belonging to the search space. As the number of dimensions of the search space increases, the number of elements in the set increases explosively, which makes it substantially impossible to perform an exhaustive search.

Simulated annealing mimics a metal annealing process that yields a crystal structure with few defects by gradually cooling a metal. Each point belonging to the search space corresponds to a respective state of physical phenomena, and the objective function corresponds to the energy of the system at each state. The concept of temperature is introduced to the probability of occurrence of each state. A probability distribution is then configured such that at any given temperature, the smaller the energy at a state is, the higher the probability of occurrence of the state is, and such that the lower the temperature is, the greater the ratio between the probabilities of occurrences of two states having different energies is. Lowering temperature at a sufficiently slow rate, while creating successive states with gradual state changes such as to realize the above-noted probability distribution, may allow the state to be converged on an optimum solution having the smallest energy value. The noted probability distribution may be a Boltzmann distribution.

A Markov chain Monte Carlo method may be used to realize a state distribution matching such a probability distribution. In the Markov chain Monte Carlo method, use of adequately designed transition probabilities enables a series of Markov chain samples performing transitions according to such transition probabilities to be converged on a desired stationary distribution. By utilizing this arrangement, state transitions in simulated annealing are performed according to proper transition probabilities, so as to achieve a state distribution matching a desired probability distribution.

For example, the Metropolis method, which is a representative algorithm for the Markov chain Monte Carlo method, may be used to achieve a Boltzmann distribution. When $\Delta E$ represents a change in energy from a current state to a next state, a probability P with which a transition to the next state occurs is defined as follows.

$$P = \min[1, \exp(-\beta \Delta E)]$$

Here, $\beta$ is thermodynamic beta (i.e., the reciprocal of absolute temperature T), and is equal to $1/T$. The function $\min[1, x]$ assumes a value of 1 or a value of x, whichever is smaller. According to the above formula, a transition to the next state occurs with probability "1" in the case of $\Delta E \leq 0$, and a transition to the next state occurs with probability $\exp(-\beta \Delta E)$ in the case of $0 < \Delta E$. After repeating a state transition according to such transition probabilities a sufficiently large number of times, a system is realized in which the distribution (i.e., probability density distribution) of energies of respective states is proportional to a Boltzmann distribution. Lowering temperature at a sufficiently slow rate, while causing transitions in the states in such a system based on the Metropolis method, allows the state to be converged on the optimum solution having the smallest energy value.

In simulated annealing, convergence on the optimum solution is guaranteed if calculations are performed according to the temperature lowering schedule that is determined on an optimization-problem-specific basis. However, the optimum solution is not readily obtained within a practically feasible computational time. It is also difficult to determine a proper temperature lowering schedule on a problem-specific basis for each problem for which optimization calculations are performed. A simple approach to solve these problems is to prepare a plurality of systems in which simulated annealing is performed to search for the optimum solution, and to let the plurality of systems run independently of and in parallel to each other. The larger the number of systems is, the higher the probability of finding a solution close to the optimum solution is.

A more sophisticated approach is a replica exchange method which prepares a plurality of systems having different temperatures, lets them run in parallel to each other, and exchanges states or temperatures between the systems with a properly designed probability. The probability of exchange is determined such that the joint distribution function obtained by multiplying the probability distributions of all the systems stays constant upon an exchange operation. When attention is focused on a series of states for which state transitions are performed with the passage of time, performing the above-noted exchange means that the noted series of states moves from system to system over the plurality of systems having different temperatures in search of the optimum solution. With the replica exchange method, there is no need to determine a temperature lowering schedule, yet it is expected that a better solution is obtained in a shorter time, compared with a simple simulated annealing algorithm.

However, exchange between systems may not be sufficiently performed, depending on the energies and temperatures of the respective systems. For example, a certain energy distribution of systems may continue to be present, and may be such that a system having a certain temperature has a very high probability of exchange with a system having a higher temperature, and has a very low probability of exchange with a system having a lower temperature. The continuation of such a condition creates a wall at which a state transition cannot be made from the lower-temperature side to the higher-temperature side at the noted certain temperature. What is important in the replica exchange method is to ensure that a series of states can move back and forth over the entire temperature range between the lowest temperature and the highest temperature. The presence of such a wall prevents convergence on an optimal solution.

RELATED-ART DOCUMENTS

Patent Document

[Patent Document 1] Japanese Laid-open Patent Publication No. 2018-5541
[Patent Document 2] Japanese Patent Laid-open Publication No. 9-231197

SUMMARY

According to an aspect of the embodiment, an optimization apparatus includes electronic circuits configured to perform calculating, for a plurality of annealing units to which respective states and respective, different temperatures corresponding to the respective states are assigned, respective evaluation function values responsive to the respective states, and causing a transition in the states with probabilities responsive to the respective temperatures and the respective evaluation function values, exchanging the temperatures or the states between the plurality of annealing units with predetermined probabilities based on the temperatures and the evaluation function values, and changing a temperature of an annealing unit of interest among the plurality of annealing units, such that a probability of exchange between the annealing unit of interest and a first annealing unit situated next thereto on a lower temperature side in a sequence arranged in order of temperature approaches a probability of exchange between the annealing unit of interest and a second annealing unit situated next thereto on a higher temperature side in the sequence arranged in order of temperature.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a drawing illustrating an example of a replica-number correspondence table stored in a state number storage unit;
FIG. 6 is a drawing illustrating an example of a temperature correspondence table stored in a temperature storage unit;
FIG. 12 is a drawing illustrating an example of the operation in which temperature adjustment is performed with respect to all consecutive temperature sequence numbers.

DESCRIPTION OF EMBODIMENTS

In the following, embodiments of the invention will be described with reference to the accompanying drawings. In these drawings, the same or corresponding elements are referred to by the same or corresponding numerals or characters, and a description thereof will be omitted as appropriate.

Figure 1:
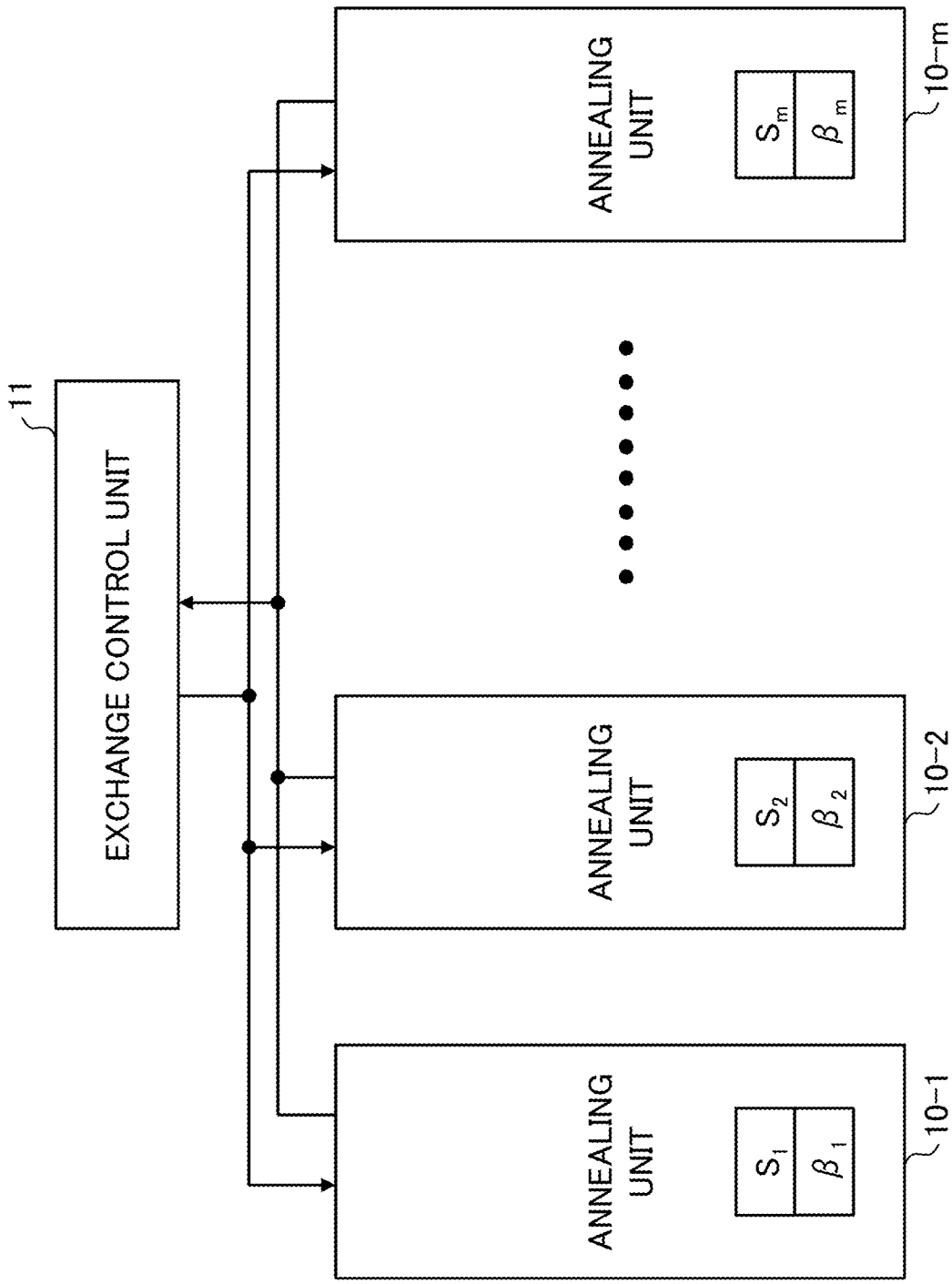
FIG. 1 is a drawing illustrating an example of the configuration of an optimization apparatus.

FIG. 1 is a drawing illustrating an example of the configuration of an optimization apparatus. The optimization apparatus includes a plurality of annealing units 10-1 through 10-$m$ and an exchange control unit 11. The annealing units 10-1 through 10-$m$ and the exchange control unit 11 are implemented as hardware based on electronic circuits. In FIG. 1 and the subsequent similar drawings, boundaries between functional or circuit blocks illustrated as boxes basically indicate functional boundaries, and may not correspond to separation in terms of physical positions, separation in terms of electrical signals, separation in terms of control logic, etc. Each functional or circuit block may be a hardware module that is physically separated from other blocks to some extent, or may indicate a function in a hardware module in which this and other blocks are physically combined together.

The annealing units 10-1 through 10-$m$ (m is an integer greater than or equal to 2) hold respective states $S_1$ through $S_m$, and are assigned with respective, different thermodynamic betas $\beta_1$ through $\beta_m$, which realizes a plurality of systems having different temperatures. Here, $\beta$ is the reciprocal of absolute temperature T (i.e., 1/T). The number m of annealing units 10-1 through 10-$m$ may be a number corresponding the different temperatures suitable for use in the replica exchange method.

The annealing units 10-1 through 10-$m$ may perform a simulated annealing process independently of each other. Namely, the annealing units 10-1 through 10-$m$ may calculate respective evaluation function values corresponding to the states $S_1$ through $S_m$ held therein, and may cause transitions in the states $S_1$ through $S_m$ with probabilities responsive to the respective thermodynamic betas $\beta_1$ through $\beta_m$ and evaluation function values. Since the replica exchange method is used in the optimization apparatus illustrated in FIG. 1, there is no need to lower temperature in the annealing units 10-1 through 10-$m$. It suffices to repeat transitions in the states $S_1$ through $S_m$ with predetermined probabilities. The circuit configurations of the annealing units 10-1 through 10-$m$ may basically be the same.

The exchange control unit 11 exchanges thermodynamic betas (i.e., exchanges temperatures) between the annealing units 10-1 through 10-$m$ at predetermined timing with predetermined exchange probabilities that are based on the thermodynamic betas and evaluation function values. The annealing units 10-1 through 10-$m$ have the same circuit configuration, and what distinguishes them from each other is the states and temperatures assigned thereto. Thus, the states may be exchanged, instead of the temperatures. Namely, exchanging the states is equivalent to exchanging the temperatures. The following description will be directed to an example in which the exchange control unit 11 exchanges thermodynamic betas between the annealing units 10-1 through 10-m. Alternatively, the exchange control unit 11 may exchange states between the annealing units 10-1 through 10-m.

The exchange control unit 11 adjusts thermodynamic betas (i.e., adjusts temperatures) assigned to the annealing units 10-1 through 10-m, as will be described later. More specifically, the temperature of an annealing unit of interest is changed such that a probability of exchange between the annealing unit of interest and another annealing unit situated next thereto on a lower temperature side in order of temperature approaches a probability of exchange between the annealing unit of interest and another annealing unit situated next thereto on a higher temperature side. Such temperature adjustment ensures that sufficient exchange occurs in the replica exchange method.

Figure 2:
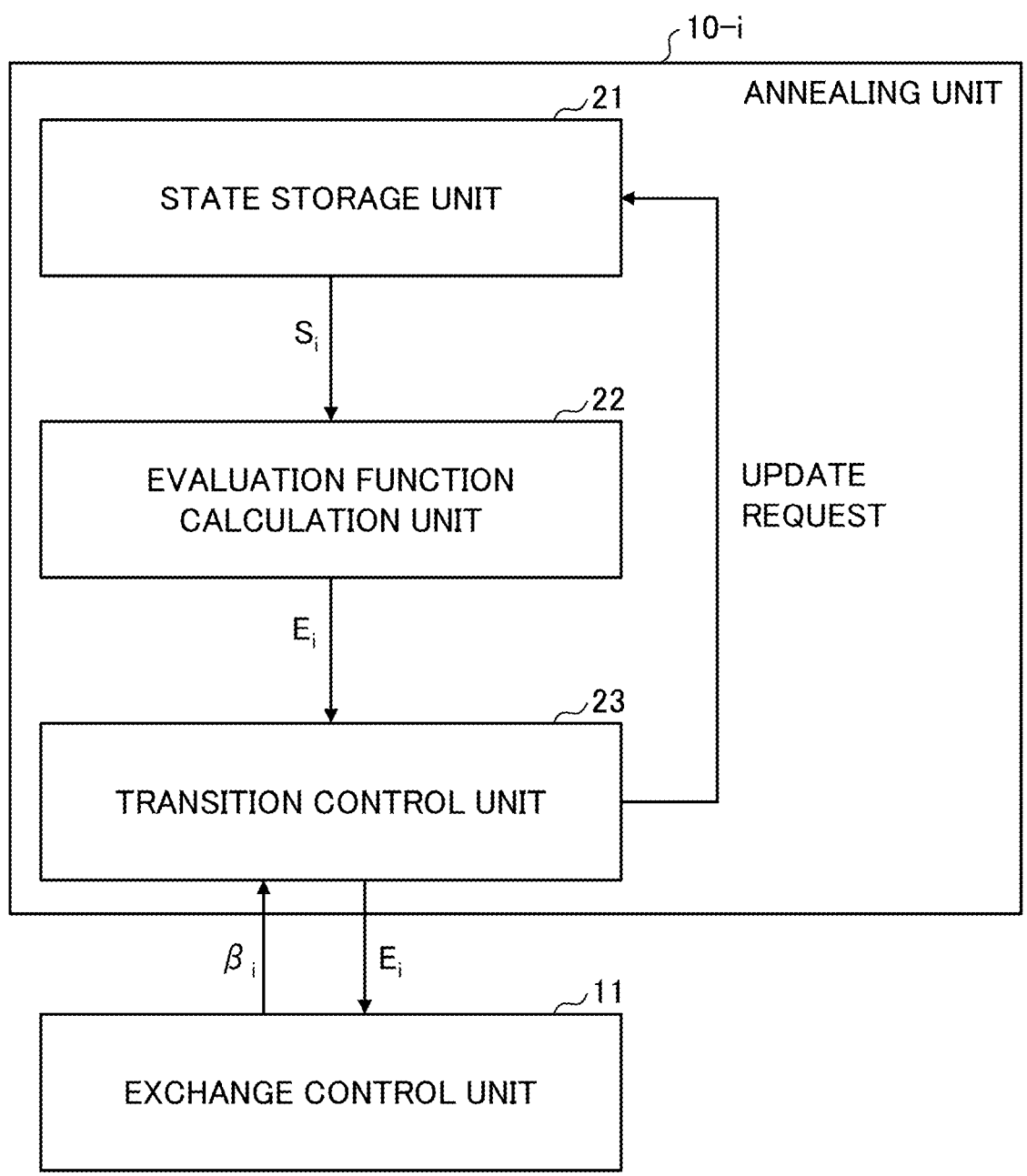
FIG. 2 is a drawing illustrating an example of the configuration of an annealing unit.

FIG. 2 is a drawing illustrating an example of the configuration of an annealing unit. FIG. 2 illustrates the configuration of the i-th annealing unit 10-i as a representative of the annealing units 10-1 through 10-m. FIG. 2 only illustrates the configuration necessary to perform a simulated annealing process in the annealing unit.

The annealing unit 10-i includes a state storage unit 21, an evaluation function calculation unit 22, and a transition control unit 23. The state storage unit 21 may be a register or a memory device that stores therein the state Si of the annealing unit 10-i. The evaluation function calculation unit 22 receives the state $S_i$ stored in the state storage unit 21, and calculates an evaluation function value $E_i$ responsive to the state $S_i$. The transition control unit 23 controls a transition from the current state to the next state based on the thermodynamic beta $\beta_1$ assigned by the exchange control unit 11 and the evaluation function value $E_i$ calculated by the evaluation function calculation unit 22.

Specifically, the evaluation function calculation unit 22 calculates the evaluation function value $E_i$ of the current state $S_i$, and also calculates the evaluation function value $E'_i$ of a candidate next state $S'_i$ that has a slight change from the current state $S_i$, followed by calculating a difference $\Delta E$ (= $E'_i - E_i$). In the case in which the Boltzmann distribution is used to represent the probability distribution of $S_i$ and the Metropolis method is used, for example, a probability P with which a transition to the next state $S'_i$ occurs may be defined by the following formula.

$$P = \min[1, \exp(-\beta_i \Delta E)] \quad (1)$$

The Metropolis method is a non-limiting example, and other transition control algorithms such as Gibbs sampling may alternatively be used. The following description will be directed to an example in which the Metropolis method is used.

The transition control unit 23 determines whether or not to make a transition to the next state $S'_i$ in accordance with the probability P. Upon determining that a transition is to be made, the transition control unit 23 instructs the state storage unit 21 to change the state $S_i$ to the state $S'_i$ (or rewrites the state $S_i$ of the state storage unit 21 into the state $S'_i$). Upon determining that a transition is not to be made, no transition is performed, so that the current state $S_i$ is maintained as it is. The annealing unit 10-i repeats the above-described process multiple times to perform an annealing process.

The form of the evaluation function is not limited to a particular form, and may be an energy function based on an Ising model, for example, as shown below.

$$E_i(S_i) = -\sum_{j=1}^{M}\sum_{k=1}^{M} W_{jk} x_j x_k - \sum_{j=1}^{M} b_j x_j \quad (2)$$

$S_i$ is a state having M spins (M: positive integer) as follows.

$$S_i = (x_1, x_2, \ldots x_M) \quad (3)$$

Each spin assumes a value of 0 or +1. $W_{jk}$ is a weighting factor for the coupling between spins, and may be such that $W_{jj}=0$. Further, $b_j$ is a bias.

Figure 3:
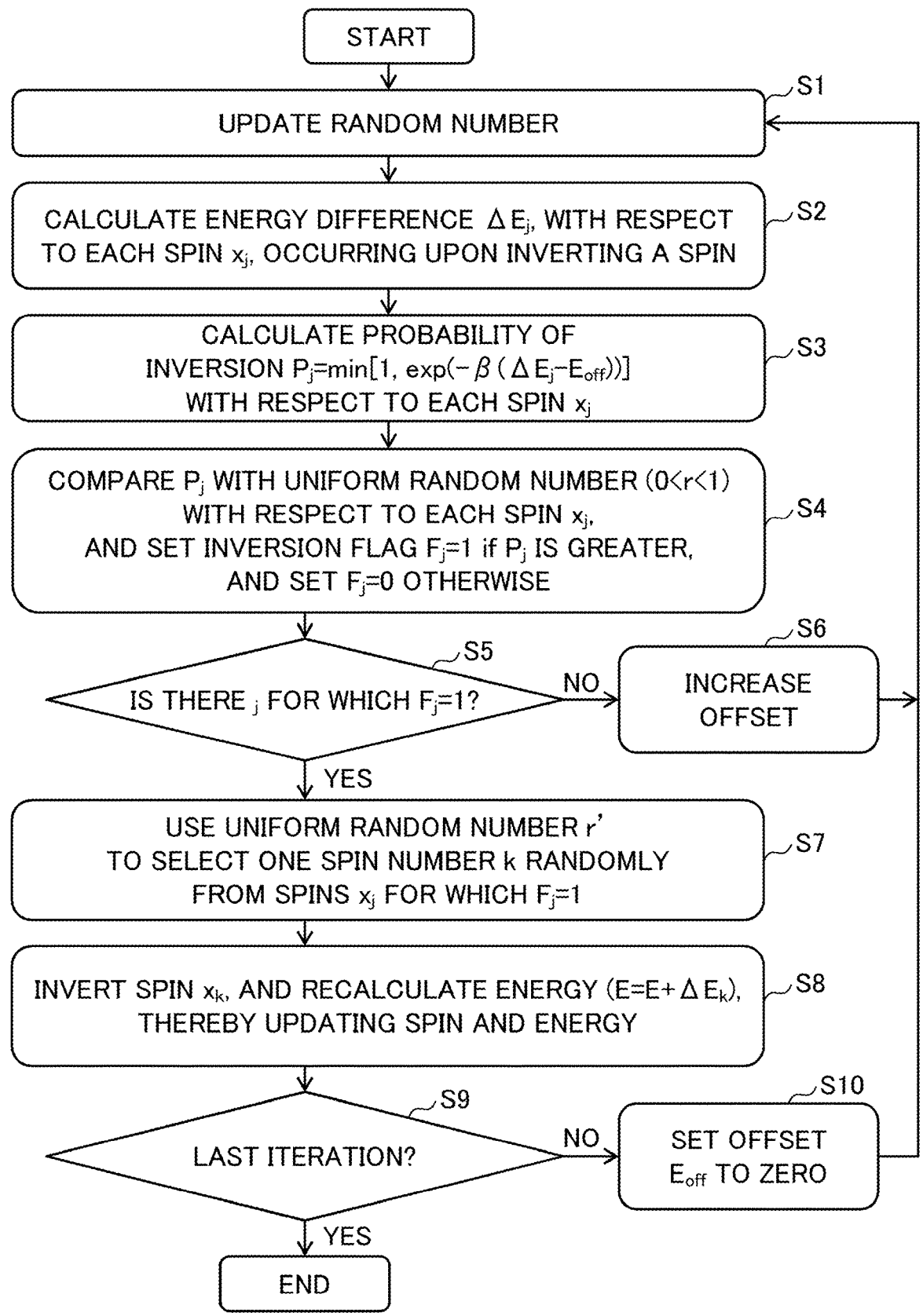
FIG. 3 is a flowchart illustrating a specific example of the annealing process performed by the annealing unit.

FIG. 3 is a flowchart illustrating a specific example of the annealing process performed by the annealing unit. The annealing process illustrated in FIG. 3 is performed by the units of the annealing unit 10-i illustrated in FIG. 2.

It may be noted that, in FIG. 3 and the subsequent flowcharts, an order in which the steps illustrated in the flowchart are performed is only an example. The scope of the disclosed technology is not limited to the disclosed order. For example, a description may explain that an A step is performed before a B step is performed. Despite such a description, it may be physically and logically possible to perform the B step before the A step while it is possible to perform the A step before the B step. In such a case, all the consequences that affect the outcomes of the flowchart may be the same regardless of which step is performed first. It then follows that, for the purposes of the disclosed technology, it is apparent that the B step can be performed before the A step is performed. Despite the explanation that the A step is performed before the B step, such a description is not intended to place the obvious case as described above outside the scope of the disclosed technology. Such an obvious case inevitably falls within the scope of the technology intended by this disclosure.

In step S1 of FIG. 3, the evaluation function calculation unit 22 of the annealing unit updates a random number. In step S2, the evaluation function calculation unit 22 calculates an energy difference $\Delta E_j$ occurring upon inverting a spin $x_j$ (i.e., the value obtained by subtracting the energy prior to the inversion from the energy after the inversion) with respect to each spin. In step S3, the transition control unit 23 calculates a probability of inversion $P_j$ with respect to each spin $x_j$. Namely, the probability with which the transition inverting the spin $x_j$ occurs is calculated by use of the previously noted formula (1). In so doing, an energy offset $E_{off}$ is introduced to adjust the probability of inversion, such that the probability of inversion is calculated by use of $\Delta E_j - E_{off}$ in place of $\Delta E$ in the formula (1). The initial value of the offset $E_{off}$ is zero.

In step S4, the transition control unit 23 compares the probability of inversion $P_j$ with a uniform random number r (0<r<1) with respect to each spin $x_j$, and sets an inversion flag $F_j$ corresponding to the spin $x_j$ to 1 if $P_j > r$. If $P \leq r$, the inversion flag $F_j$ is set to 0. In step S5, the transition control unit 23 checks whether there is an inversion flag $F_j$ that is 1. In the case of no inversion flag $F_j$ being 1, the transition control unit 23 increases the offset $E_{off}$ by a predetermined amount. Thereafter, the procedure returns to step S1, from which the subsequent steps are repeated.

In the case of one or more inversion flags $F_j$ being 1, the procedure proceeds to step S7. In step S7, the transition control unit 23 uses a uniform random number r' to select one spin $x_k$ randomly from the spins $x_j$ for which the inversion flags $F_j$ are 1. In step S8, the transition control unit 23 inverts the spin $x_k$, and recalculates the energy observed after the inversion of the spin $x_k$, thereby updating the state and the energy.

In step S9, the transition control unit 23 checks whether the last one of the iterations the total number of which is specified for the annealing process has been completed. In the case in which the last iteration has not been completed, the transition control unit 23 resets the offset $E_{\mathit{off}}$ to zero, followed by causing the procedure to return to step S1. In the case in which the last iteration has been completed, the annealing unit brings the annealing process to an end.

Figure 4:
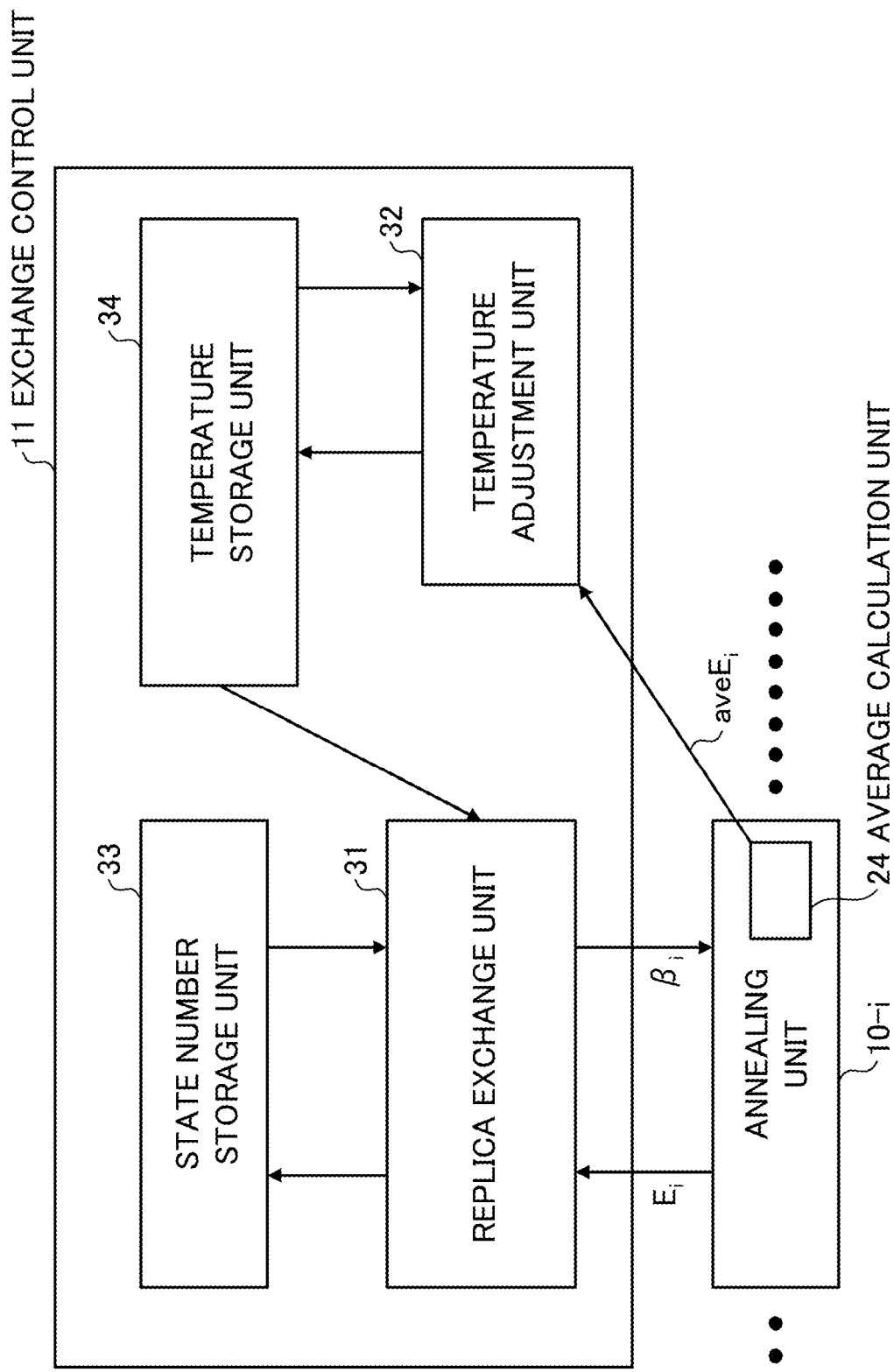
FIG. 4 is a drawing illustrating an example of the schematic configuration of an exchange control unit.

FIG. 4 is a drawing illustrating an example of the schematic configuration of the exchange control unit 11. The exchange control unit 11 illustrated in FIG. 4 includes a replica exchange unit 31, a temperature adjustment unit 32, a state number storage unit 33, and a temperature storage unit 34. The exchange control unit 11, which is coupled to the annealing unit 10-$i$, receives an evaluation function value $E_i$ and an average $aveE_i$ of evaluation function values from the annealing unit 10-$i$, and notifies the annealing unit 10-$i$ of the thermodynamic beta $\beta_i$ that is to be assigned thereto. The annealing unit 10-$i$ includes an average calculation unit 24 which calculates an average $aveE_i$ of evaluation function values over a plurality of state transitions.

In FIG. 4, only the annealing unit 10-$i$ is illustrated for the sake of convenience of illustration. It should be noted, however, that the exchange control unit 11 is coupled to the plurality of annealing units 10-1 through 10-$m$ as illustrated in FIG. 1. The exchange control unit 11 receives the evaluation function values $E_1$ through $E_m$ and the average values $aveE_1$ through $aveE_m$ from the annealing units 10-1 through 10-$m$, respectively, and notifies the annealing units 10-1 through 10-$m$ of the thermodynamic betas $\beta_i$ through $\beta_m$, respectively.

The replica exchange unit 31 performs a replica exchange process (i.e., a process that exchanges thermodynamic betas with a predetermined probability) between the annealing units 10-1 through 10-$m$ at a predetermined replica exchange timing. The predetermined replica exchange timing may be the same as the timing at which the annealing units 10-1 through 10-$m$ complete a predetermined number of transitions (i.e., iterations as described in connection with FIG. 3) in the annealing process. Namely, a predetermined number of iterations and the exchange of thermodynamic betas may alternately be performed.

The replica exchange unit 31 selects, from the annealing units 10-1 through 10-$m$, the annealing unit 10-$i$ and the annealing unit 10-$j$ for which temperatures are to be exchanged. The annealing unit 10-$i$ and the annealing unit 10-$j$ are two annealing units situated next to each other in the sequence arranged in order of thermodynamic betas (i.e., the sequence arranged in order of temperature). The thermodynamic beta $\beta_i$ of the annealing unit 10-$i$ is greater than the thermodynamic beta $\beta_j$ of the annealing unit 10-$j$. In the following description, an index n is used to identify an annealing unit in the sequence of annealing units arranged in descending order of thermodynamic betas. The annealing unit 10-$i$ and the annealing unit 10-$j$ for which temperatures are to be exchanged are denoted as an annealing unit 10-$n$ and an annealing unit 10-$n$+1, respectively. According to this notation, the annealing units 10-$n$−1, 10-$n$, and 10-$n$+1 are three consecutive annealing units in the sequence arranged in descending order of thermodynamic betas. The respective thermodynamic betas $\beta_{n-1}$, $\beta_n$, and $\beta_{n+1}$ are related in terms of magnitude as: $\beta_{n-1} > \beta_n > \beta_{n+1}$, In the following description, use of the index n signifies the fact that the sequence arranged in descending order of thermodynamic betas is referred to. It may be noted that instead of performing a process with respect to the sequence arranged in descending order of thermodynamic betas, the process may be performed with respect to the sequence arranged in ascending order of thermodynamic betas.

The replica exchange unit 31 determines whether to exchange temperatures between the annealing unit 10-$n$ and the annealing unit 10-$n$+1 based on the evaluation function values $E_n$ and $E_{n+1}$ and the thermodynamic betas $\beta_n$ and $\beta_{n+1}$ of the annealing unit 10-$n$ and the annealing unit 10-$n$+1. Specifically, temperatures are exchanged with a probability $P_t$ defined in the following.

$$P_t = \min[1, \exp\{(\beta_n - \beta_{n+1})(E_n - E_{n+1})\}] \tag{4}$$

A uniform random number and $P_t$ may be compared with each other. Thermodynamic betas may be exchanged when $P_t$ is greater than the random number. Thermodynamic betas are not exchanged when $P_t$ is less than or equal to the random number.

The replica exchange unit 31 selects two annealing units to be exchanged at each replica exchange timing, such that the above-described replica exchange process is performed with respect to all the annealing units 10-1 through 10-$m$ in time. Alternatively, the replica exchange unit 31 may perform a replica exchange process with respect to all the annealing units 10-1 through 10-$m$ in parallel. The two annealing units to be exchanged may be an odd-numbered annealing unit and the annealing unit of the next following number at an odd-numbered replica exchange timing, and may be an even-numbered annealing unit and the annealing unit having the next following number at an even-numbered replica exchange timing, for example.

The state number storage unit 33 is implemented as a replica-number correspondence table in which replica sequence numbers (i.e., the annealing-unit sequence numbers) and temperature sequence numbers are stored in association with each other. The replica sequence number has no relationship with the sequence in order of thermodynamic betas, and is a number which identifies each of the annealing units 10-1 through 10-$m$ as a physical object. Use of this replica-number correspondence table makes it possible to determine which one of the temperature sequence numbers corresponds to $\beta_i$ assigned to the annealing unit 10-$i$ having the replica sequence number i.

Further, the temperature storage unit 34 is implemented as a temperature correspondence table in which the temperature sequence numbers and thermodynamic betas (or temperatures) are stored in association with each other. Use of this temperature correspondence table makes it possible to determine which one of the temperature sequence numbers corresponds to a given temperature value. The replica-number correspondence table and the temperature correspondence table are used to manage an exchange process and the assignment of thermodynamic betas to the annealing units 10-1 through 10-$m$.

FIG. 5 is a drawing illustrating an example of a replica-number correspondence table 40 stored in the state number storage unit 33. As illustrated in FIG. 5, replica sequence numbers 0 through 15 are assigned to temperature sequence numbers 0 through 15, respectively. FIG. 5 illustrates the correspondences between the sequence numbers in the initial state. After performing a sufficient number of replica exchanges, the relationship between the replica sequence numbers 0 through 15 and the temperature sequence numbers 0 through 15 will appear to be random. In doing so, it may be preferable that the temperature sequence numbers 0 through 15 stay in the ascending order as illustrated in FIG. 5 while rearranging the order of replica sequence numbers. This is because temperatures are exchanged between two temperatures that are immediately next to each other in order of temperature. Maintaining the temperature arrangement in the original order given in the replica-number correspondence table 40 makes it easier to identify the replica sequence numbers corresponding to the two adjacent temperatures. FIG. 5 is directed to an example in which the number of entries in the table is 16. The number of table entries is not limited to a particular number.

FIG. 6 is a drawing illustrating an example of a temperature correspondence table 41 stored in the temperature storage unit 34. As illustrated in FIG. 6, temperature sequence numbers 0 through 15 are assigned to thermodynamic beta values A through P, respectively. In the present embodiment, thermodynamic beta values A through P are arranged in the descending order. Namely, the thermodynamic beta becomes higher (i.e., temperature becomes lower) toward the temperature sequence number 0, and becomes lower (i.e., temperature becomes higher) toward the temperature sequence number 15. FIG. 6 is directed to an example in which the number of entries in the table is 16. The number of table entries is not limited to a particular number.

Referring to FIG. 4 again, upon determining that thermodynamic betas are to be exchanged between the annealing unit 10-$n$ and the annealing unit 10-$n$+1, the replica exchange unit 31 exchanges the position of the replica sequence number n with the position of the replica sequence number n+1 in the replica-number correspondence table 40. Exchanging the position of the replica sequence number n with the position of the replica sequence number n+1 in this manner enables the switching of correspondences between the replica sequence numbers n and n+1 and the temperature sequence numbers assigned thereto. In FIG. 5, for example, the replica sequence number "10" and the replica sequence number "11" correspond to the temperature sequence number "10" and the temperature sequence number "11", respectively. From this state, the replica sequence numbers are switched as illustrated by an arrow to update the replica-number correspondence table 40 such that the replica sequence numbers 11 and 10 correspond to the temperature sequence numbers 10 and 11, respectively.

The replica exchange unit 31 identifies the temperature sequence number corresponding to the replica sequence number i in the replica-number correspondence table 40, followed by retrieving the thermodynamic beta value corresponding to this temperature sequence number from the temperature correspondence table 41 as the value of the thermodynamic beta $\beta_i$ that is to be sent to the annealing unit 10-$i$. The replica exchange unit 31 sends the retrieved thermodynamic beta value to the annealing unit 10-$i$ as the value of the thermodynamic beta $\beta_i$.

The temperature adjustment unit 32 illustrated in FIG. 4 adjusts temperature by rewriting a thermodynamic beta value (or temperature value) listed in the temperature correspondence table 41 stored in the temperature storage unit 34 at the timing immediately following the exchange of replicas by the replica exchange unit 31. More specifically, the temperature adjustment unit 32 changes the temperature of the annealing unit 10-$n$ of interest such that a probability of exchange between a first annealing unit 10-$n$−1 and the annealing unit 10-$n$ of interest approaches a probability of exchange between a second annealing unit 10-$n$+1 and the annealing unit 10-$n$ of interest. The first annealing unit 10-$n$−1 is the one which is situated immediately next to the annealing unit 10-$n$ of interest on the lower temperature side (i.e., on the higher thermodynamic beta side) in order of temperature. The second annealing unit 10-$n$+1 is the one which is situated immediately next to the annealing unit 10-$n$ of interest on the higher temperature side (i.e., on the lower thermodynamic beta side) in order of temperature.

The probability of exchange is calculated by use of the formula (4) as was previously described. As is understood from the formula (4), the probability of exchange has a value responsive to the absolute temperatures and the evaluation function values of the two systems that may be exchanged. The evaluation function value exhibits minute fluctuation in response to state changes. If such local fluctuation affects the temperature adjustment, stable temperature adjustment may become difficult. In consideration of this, the temperature adjustment unit 32 may cause probabilities of exchange to approach each other in the average sense when changing the temperature of the annealing unit 10-$n$ of interest to bring two probabilities of exchange closer to each other. More specifically, the temperature adjustment unit 32 may change the temperature of the annealing unit 10-$n$ of interest such that when a probability of exchange is calculated by using average values of evaluation function values over a plurality of state transitions, the probability of exchange between the first annealing unit and the annealing unit of interest approaches the probability of exchange between the second annealing unit and the annealing unit of interest. In this manner, an average value aveE of evaluation function values, rather than the evaluation function value E itself, is used to calculate probabilities of exchanges, and the temperature of the annealing unit 10-$n$ of interest is changed such that the two probabilities of exchange approach each other. This arrangement enables the stable adjustment of temperature that is not affected by a local fluctuation of states.

Specifically, the temperature adjustment unit 32 may compare a value of $\exp\{(\beta_{n-1}-\beta_n)(aveE_{n-1}-aveE_n)\}$ and a value of $\exp\{(\beta_n-\beta_{n+1})(aveE_n-aveE_{n+1})\}$. Since the objective is to decide which one of these two values is greater than the other, it may suffice for the temperature storage unit 34 to compare the exponents of the two values. More specifically, the temperature storage unit 34 may adjust $\beta_n$ according to the following algorithm.

<A1: Sign Check>

When either ($aveE_{n-1}-aveE_n$) or ($aveE_n-aveE_{n+1}$) is positive (i.e., at least one of the two probabilities of exchange is 1), no adjustment is made for $\beta_n$.

<A2: Direction Determination 1>

When $|(\beta_{n-1}-\beta_n)(aveE_{n-1}-aveE_n)|>|(\beta_n-\beta_{n+1})(aveE_n-aveE_{n+1})|$, $\beta_n$ is brought closer to $\beta_{n-1}$ (i.e., $\beta_n$ is increased).

<A2: Direction Determination 2>

When $|(\beta_{n-1}-\beta_n)(aveE_{n-1}-aveE_n)|<|(\beta_n-\beta_{n+1})(aveE_n-aveE_{n+1})|$, $\beta_n$ is brought closer to $\beta_{n+1}$ (i.e., $\beta_n$ is decreased). As described above, control is performed such that no adjustment of $\beta_n$ is made when at least one of the two probabilities of exchange is 1. With this arrangement, unnecessary temperature adjustment is avoided at the temperature point at which replica exchange is sufficiently performed.

The thermodynamic beta values in the temperature correspondence table 41 updated by the temperature adjustment unit 32 are sent from the replica exchange unit 31 to the annealing units 10-1 through 10-$m$. After the replica exchange process and the temperature adjustment process described above, the annealing units 10-1 through 10-$m$ perform the annealing process as previously described.

Figure 7:
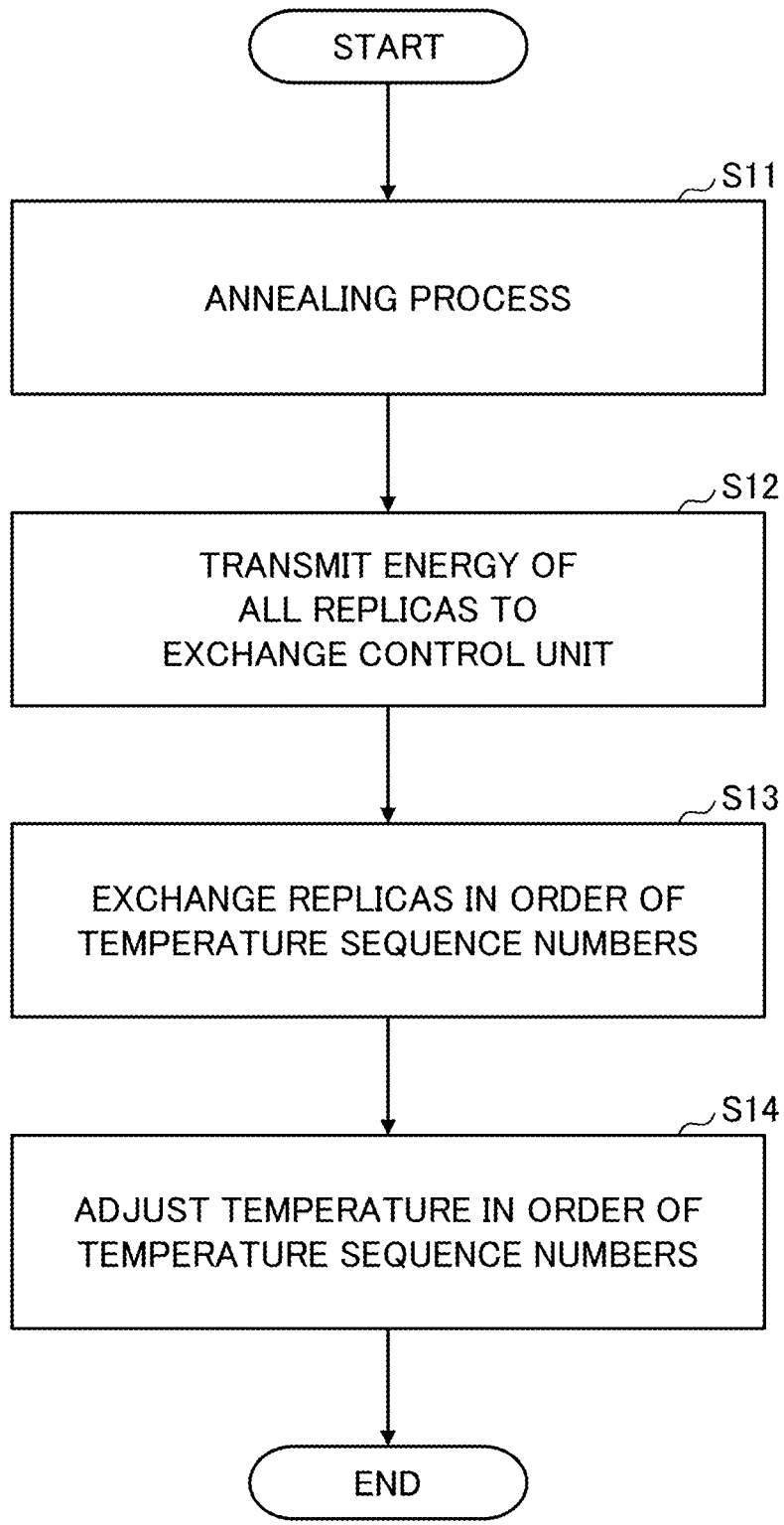
FIG. 7 is a schematic flowchart illustrating an example of the operation of the optimization apparatus illustrated in FIG. 1.

FIG. 7 is a schematic flowchart illustrating an example of the operation of the optimization apparatus illustrated in FIG. 1. In step S11, the annealing units 10-1 through 10-$m$ perform an annealing process. In step S12, the annealing units 10-1 through 10-$m$ transmit the evaluation function values $E_1$ through $E_m$ and the average evaluation function values $aveE_1$ through $aveE_m$ to the exchange control unit 11, respectively.

In step S13, the exchange control unit 11 performs replica exchange processes with respect to all the annealing units 10-1 through 10-m, and each replica exchange process is performed with respect to two annealing units situated next to each other in order of temperature sequence numbers (i.e., in order of temperature). In step S14, the exchange control unit 11 adjusts thermodynamic beta values with respect to all the annealing units 10-1 through 10-m, such that the probabilities of exchange each defined between two annealing units situated next to each other in order of temperature sequence numbers approach each other.

The procedure from the step S11 through the step S14 constitutes one round process. The optimization apparatus illustrated in FIG. 1 repeatedly performs this one round process multiple times to perform a replica-exchange-method-based annealing process.

Figure 8:
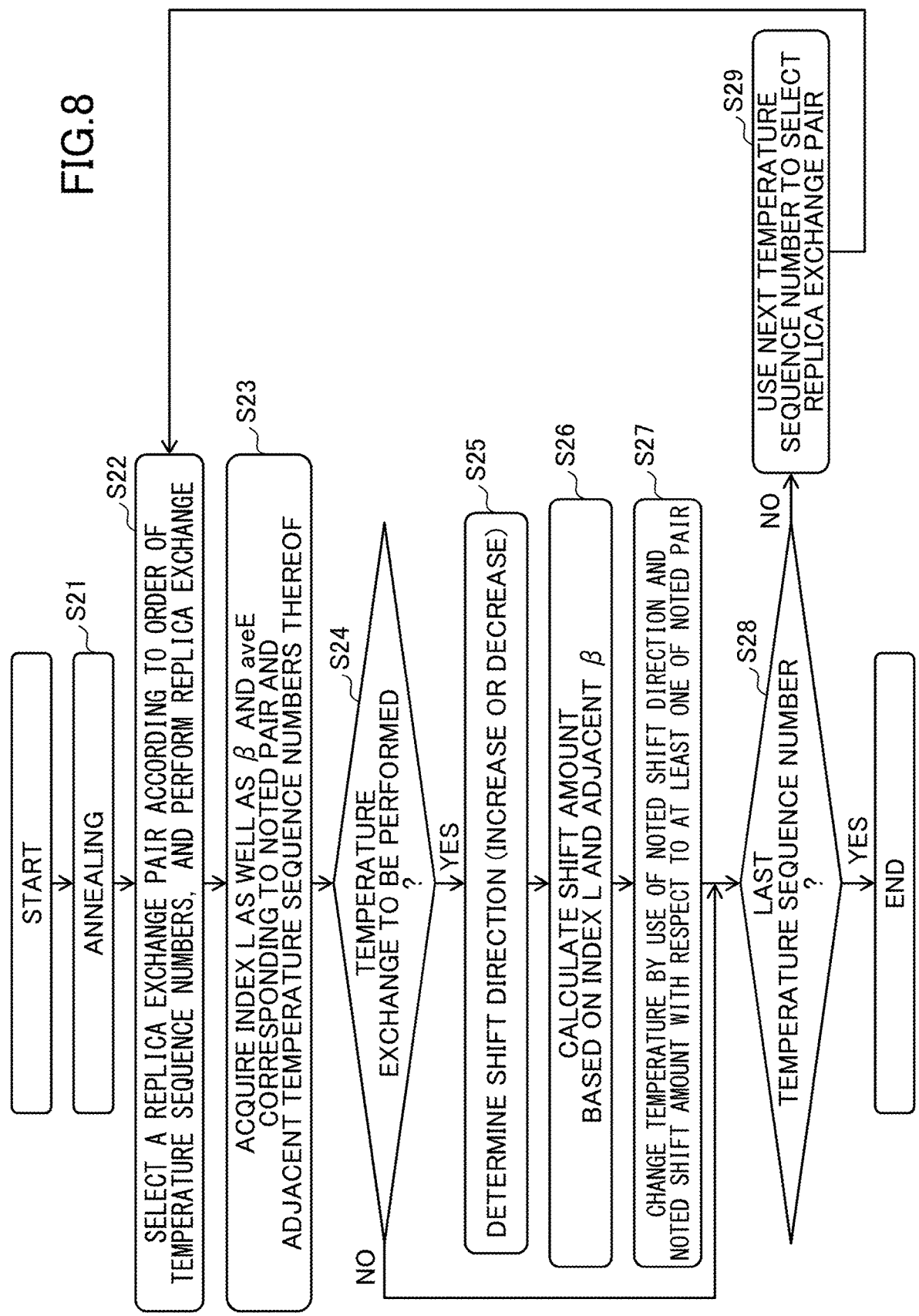
FIG. 8 is a detailed flowchart illustrating an example of the operation of the optimization apparatus illustrated in FIG. 1.

FIG. 8 is a detailed flowchart illustrating an example of the operation of the optimization apparatus illustrated in FIG. 1. In step S21, the annealing units 10-1 through 10-m perform an annealing process. After performing a predetermined number of iterations in the annealing process, the annealing units 10-1 through 10-m may transmit the evaluation function values $E_1$ through $E_m$ and the average evaluation function values $aveE_1$ through $aveE_m$ to the exchange control unit 11, respectively.

In steps S22, the replica exchange unit 31 of the exchange control unit 11 selects a replica exchange pair (i.e., two annealing units) according to the order of temperature sequence numbers, and performs a replica exchange process (i.e., a process that exchanges thermodynamic betas with a predetermined probability) between the two annealing units of the selected pair. In so doing, the replica exchange unit 31 may set a temperature sequence number variable to the initial value "0", and selects, as a first replica exchange pair, the annealing unit corresponding to the temperature sequence number "0" and the annealing unit corresponding to the temperature sequence number "1" in the replica-number correspondence table 40 illustrated in FIG. 5, for example. In this case, what the replica exchange unit 31 is going to perform is a replica exchange process with respect to the annealing unit corresponding to an even-numbered temperature sequence number and the annealing unit corresponding to the next following temperature sequence number. When a replica exchange process is to be performed with respect to the annealing unit corresponding to an odd-numbered temperature sequence number and the annealing unit corresponding to the next following temperature sequence number, the replica exchange unit 31 may select, as a first replica exchange pair, the annealing unit corresponding to the temperature sequence number "1" and the annealing unit corresponding to the temperature sequence number "2".

In step S23, the temperature adjustment unit 32 of the exchange control unit 11 acquires an index L and data of the thermodynamic betas β and the average evaluation function values aveE corresponding to the noted pair and the adjacent temperature sequence numbers thereof. A replica exchange process is performed with respect to a pair having a starting point at an odd number or with respect to a pair having a starting point at an even number. Matching this, temperature adjustment may also be performed with respect to a thermodynamic beta that is either an odd-numbered one or an even-numbered one. When temperature adjustment is to be performed with respect to either an odd-numbered temperature sequence number or an even-numbered temperature sequence number, the temperature sequence numbers of a replica exchange pair may be n and n+1. In this case, data of β and aveE corresponding to the temperature sequence numbers n−1, n, and n+1 may be acquired in step S23, followed by adjusting the thermodynamic beta $\beta_n$. Alternatively, temperature adjustment may be performed with respect to all the thermodynamic betas having consecutive temperature sequence numbers. When temperature adjustment is to be performed with respect to all the consecutive temperature sequence numbers, the temperature sequence numbers of a replica exchange pair may be n and n+1. In this case, data of β and aveE corresponding to the temperature sequence numbers n−1, n, n+1, and n+2 may be acquired in step S23, followed by adjusting the thermodynamic betas $\beta_n$ and $\beta_{n+1}$. In doing so, the thermodynamic beta $\beta_n$ may be adjusted by a process using the data corresponding to the temperature sequence numbers n−1, n, and n+1, and the thermodynamic beta $\beta_{n+1}$ may be adjusted by a process using the data corresponding to the temperature sequence numbers n, n+1, and n+2. In the case of the temperature sequence number n being 0, or in the case of the temperature sequence number n+1 being the last sequence number, no temperature adjustment process is performed with respect to either the temperature sequence number "0" or the temperature sequence number "n+1".

When acquiring data in step S23, the temperature adjustment unit 32 may obtain data of β and aveE directly from the annealing units 10-1 through 10-m and the temperature correspondence table 41 based on the replica numbers of the replica exchange pair selected by the replica exchange unit 31. Alternatively, the temperature adjustment unit 32 may obtain all or part of the data of the thermodynamic betas β and the average evaluation function values aveE from the replica exchange unit 31.

In step S24, the temperature adjustment unit 32 uses the previously described algorithm based on the thermodynamic betas β and the average evaluation function values aveE to determine whether to adjust the thermodynamic beta of the annealing unit 10-n of interest (i.e., the annealing unit corresponding to the temperature sequence number n).

Upon having determined that temperature adjustment is to be performed, the temperature adjustment unit 32 in step S25 determines a shift direction (i.e., whether to increase or decrease β) in accordance with the previously described algorithm. In step S26, the temperature adjustment unit 32 determines a shift amount based on the index L and the thermodynamic beta of the adjacent annealing unit. Specifically, the shift amount is calculated by multiplying, by $\frac{1}{2^L}$, a difference between the thermodynamic beta β of the annealing unit of interest and the thermodynamic beta β of the adjacent annealing unit situated on the side toward which the thermodynamic beta β of the annealing unit of interest (i.e., the annealing unit for thermodynamic beta adjustment) is brought closer. The calculation of a shift amount will be described later in detail. In step S27, the temperature adjustment unit 32 shifts the thermodynamic beta of the at least one of the two annealing units of the noted pair (i.e., the n-th annealing unit or the n-th and n+1-th annealing units) by the above-noted shift amount in the above-noted shift direction.

The procedure thereafter proceeds from step S27 to step S28. If it is determined in step S24 that temperature adjustment is not to be performed, the procedure also proceeds to step S28 from step S24.

In step S28, the temperature adjustment unit 32 determines whether the currently set temperature sequence number variable indicates the last temperature sequence number.

Upon having determined that the current number is not the last temperature sequence number, the temperature adjustment unit 32 increases the temperature sequence number variable by 2 in order to specify the next pair for a replica exchange process. Thereafter, the procedure returns to step S22, from which the subsequent processes are repeated.

In the case in which thermodynamic beta adjustment is performed alternately with respect to odd-numbered temperature sequence numbers and even-numbered temperature sequence numbers, the thermodynamic betas in the temperature correspondence table 41 may be successively updated in a consecutive manner. On the other hand, in the case in which thermodynamic beta adjustment is performed with respect to all the consecutive temperature sequence numbers, updated thermodynamic beta values that are successively calculated may be temporarily retained in registers or the like. After the calculation of all the updated thermodynamic beta values comes to an end, the thermodynamic betas in the temperature correspondence table 41 may be updated from the registers at once.

The above-described procedure proceeds by successively increasing the temperature sequence number variable from the smallest number. Alternatively, the temperature sequence number variable may be successively decreased from the largest number. As illustrated in FIG. 8, temperature adjustment may be performed sequentially for a successive pair. Alternatively, temperature adjustment may be performed simultaneously in parallel with respect to all the pairs.

Figure 9:
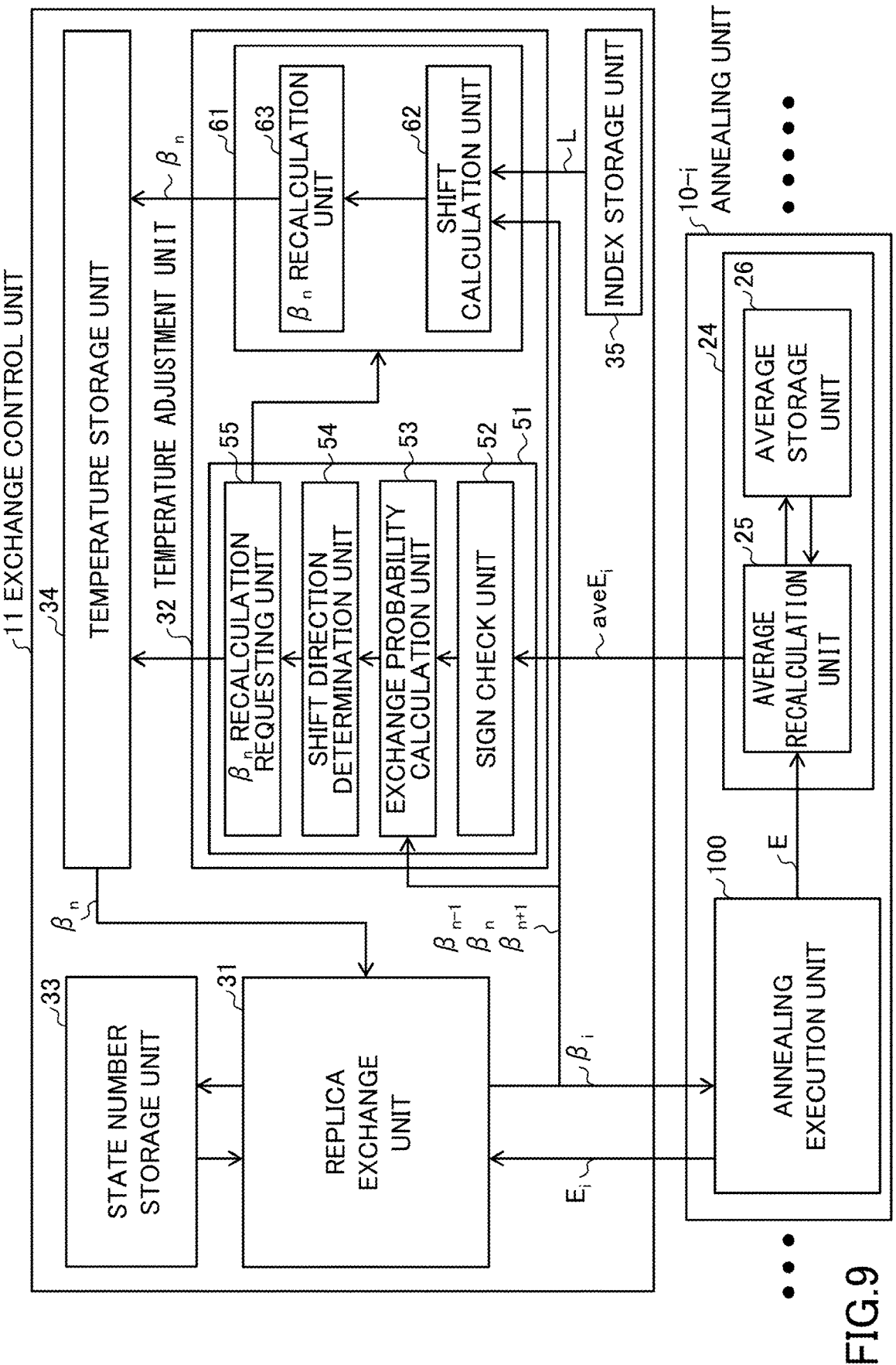
FIG. 9 is a drawing illustrating an example of the detailed configuration of the exchange control unit.

FIG. 9 is a drawing illustrating an example of the detailed configuration of the exchange control unit 11. The configurations of the exchange control unit 11 and the annealing unit 10-$i$ illustrated in FIG. 9 include finer details than the configurations of the exchange control unit 11 and the annealing unit 10-$i$ illustrated in FIG. 4. The exchange control unit 11 illustrated in FIG. 9 include finer details regarding the configuration of the temperature adjustment unit 32 and the input and output signals thereof than the exchange control unit 11 illustrated in FIG. 4.

The exchange control unit 11 illustrated in FIG. 9 includes the replica exchange unit 31, the temperature adjustment unit 32, the state number storage unit 33, the temperature storage unit 34, and an index storage unit 35. The index storage unit 35 is a register that stores the index L described in connection with the procedure of the flowchart of FIG. 8. The index L may be set to a desired value from an external source.

The annealing unit 10-$i$ illustrated in FIG. 9 includes an annealing execution unit 100 and an average calculation unit 24. The annealing execution unit 100 may corresponds to the state storage unit 21, the evaluation function calculation unit 22, and the transition control unit 23 illustrated in FIG. 2. The average calculation unit 24 includes an average recalculation unit 25 and an average storage unit 26. The average recalculation unit 25 successively updates the average evaluation function value aveE by use of the following formula.

$$aveE = aveE + (E - aveE)(\tfrac{1}{2}^K) \quad (5)$$

K is a positive integer corresponding to the size of the range over which an average is taken. The evaluation function value E and the average evaluation function value aveE may be represented as fixed-point numbers in the optimization apparatus. The divisor ($2^K$) for calculating the average evaluation function value aveE is an exponentiation of 2. Accordingly, the average evaluation function value aveE is calculated by using addition or subtraction of values represented as fixed-point numbers and bit shifts. This arrangement allows simple calculations to achieve fast processing speed, and allows the average recalculation unit 25 to be implemented as simple, small-scale hardware.

In the formula (5) noted above, the average evaluation function value aveE is recalculated based on the average evaluation function value aveE and the evaluation function value E. Alternatively, the average evaluation function value aveE may be obtained by taking an average of $2^K$ evaluation function values E, i.e., a moving average of evaluation function values E, over a plurality of transitions. In this case also, the average evaluation function value aveE is calculated by using addition or subtraction of values represented as fixed-point numbers and bit shifts.

The temperature adjustment unit 32 includes a temperature adjustment control unit 51 and a temperature recalculation unit 61. The temperature adjustment control unit 51 includes a sign check unit 52, an exchange probability calculation unit 53, a shift direction determination unit 54, and a $\beta_n$-recalculation requesting unit 55. The temperature recalculation unit 61 includes a shift calculation unit 62 and a $\beta_n$ recalculation unit 63.

The temperature adjustment control unit 51 may receive from the replica exchange unit 31 the temperature sequence numbers n−1 through n+1 based on which temperature adjustment calculations are to be performed, the replica sequence numbers of the corresponding annealing units 10-$n$−1 through 10-$n$+1, and the corresponding thermodynamic betas βn−1 through βn+1. Based on the received replica numbers, the temperature adjustment control unit 51 can identify $aveE_{n-1}$ through $aveE_{n+1}$ among the average evaluation function values $aveE_1$ through $aveE_m$ supplied from the annealing units 10-1 through 10-$m$, respectively.

The sign check unit 52 checks the signs of ($aveE_n - aveE_n$) and ($aveE_n - aveE_{n+1}$) to perform "A1: Sign Check" of the previously described algorithm. The temperature adjustment control unit 51 performs temperature adjustment only when both signs are negative.

The exchange probability calculation unit 53 calculates probabilities of exchange, which serve as a basis for determining a shift direction of the thermodynamic beta. The exchange probability calculation unit 53 may calculate probabilities of exchange. Alternatively, instead of calculating probabilities of exchange themselves, the exchange probability calculation unit 53 may calculate the absolute value of $(\beta_{n-1} - \beta_n)$ $(aveE_{n-1} - aveE_n)$ and the absolute value of $(\beta_n - \beta_{n+1})$ $(aveE_n - aveE_{n+1})$.

The shift direction determination unit 54 determines the direction toward which the thermodynamic beta $\beta_n$ is shifted (i.e., an increase direction or a decrease direction) based on "A2: Direction Determination 1" and "A3: Direction Determination 2" of the previously described algorithm. The $\beta_n$-recalculation requesting unit 55 sends a request to recalculate the thermodynamic beta $\beta_n$ to the temperature recalculation unit 61.

Upon receiving the request to recalculate the thermodynamic beta $\beta_n$, the temperature recalculation unit 61 uses the shift calculation unit 62 to calculate a shift S based on either one of the following formulas.

$$S = (\beta_{n-1} - \beta_n)/2^L \text{ (when } \beta_n \text{ is increased to move closer to } \beta_{n-1}) \quad (6)$$

$$S = (\beta_n - \beta_{n+1})/2^L \text{ (when } \beta_n \text{ is decreased to move closer to } \beta_{n+1}) \quad (7)$$

Here, L is a positive integer stored in the index storage unit 35.

The $\beta_n$ recalculation unit 63 increases or decreases the thermodynamic beta $\beta_n$ by the shift S calculated by the temperature recalculation unit 61, thereby calculating the updated value of the thermodynamic beta $\beta_n$.

The $\beta_n$ recalculation unit 63 sends the updated thermodynamic beta $\beta_n$ to the temperature storage unit 34, and the $\beta_n$-recalculation requesting unit 55 sends a request to update the thermodynamic beta value of the temperature sequence number n to the temperature storage unit 34. With this arrangement, the thermodynamic beta corresponding to the temperature sequence number n in the temperature correspondence table 41 (see FIG. 6) of the temperature storage unit 34 is replaced with the updated value.

The above-noted shift S (i.e., the size of a change in the thermodynamic beta) is obtained by dividing, by an exponentiation of 2 (i.e., $2^L$), a difference between the thermodynamic beta $\beta_n$ of the annealing unit 10-n of interest and one of the thermodynamic betas $\beta_{n-1}$ and $\beta_{n+1}$ of the first annealing unit 10-n−1 and the second annealing unit 10-n+1. The thermodynamic beta may be represented as a floating-point number. The calculation to update the thermodynamic beta $\beta_n$ is performed by addition or subtraction of values represented as floating-point numbers and subtraction of exponents. Accordingly, the computation cost of the thermodynamic beta updating calculation is relatively small, and the temperature recalculation unit 61 is implemented as relatively simple hardware.

The size S of a change in the thermodynamic beta $\beta_n$ for changing the temperature of the annealing unit 10-n of interest is proportional to a difference between the thermodynamic beta $\beta_n$ of the annealing unit of interest and one of the thermodynamic betas $\beta_{n-1}$ and $\beta_{n+1}$ of the first annealing unit and the second annealing unit, and, thus, can be regarded as a value responsive to the probabilities of exchange. Use of an unfixed, variable shift S makes it possible to achieve thermodynamic beta adjustment having a proper shift amount.

Figure 10:
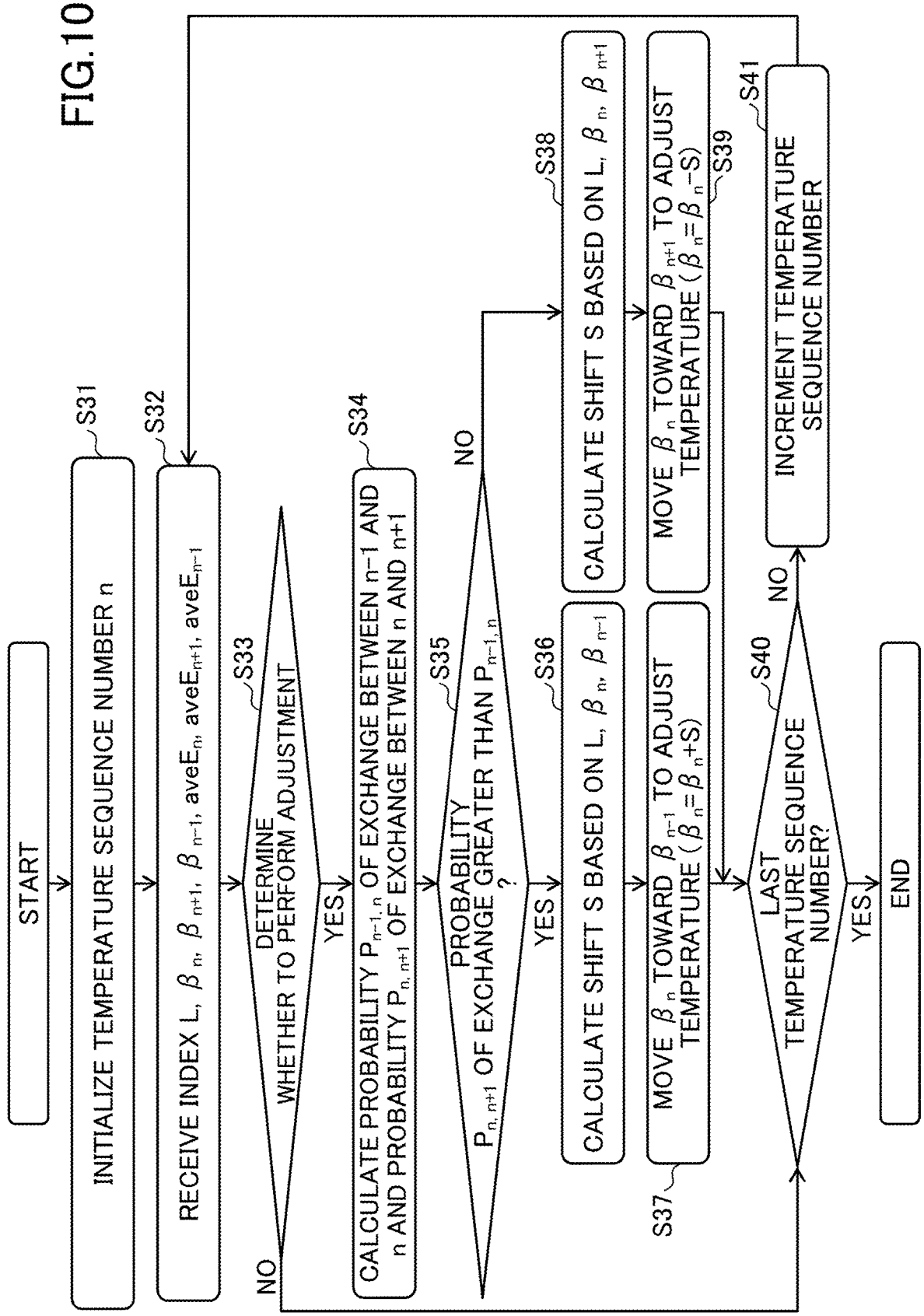
FIG. 10 is a flowchart illustrating an example of the temperature adjustment performed by a temperature adjustment unit.

FIG. 10 is a flowchart illustrating an example of the temperature adjustment performed by the temperature adjustment unit 32. The temperature adjustment process illustrated in FIG. 10 may be performed in conjunction with a replica exchange process as was described in connection with the flowchart of the operation of the optimization apparatus illustrated in FIG. 8. Alternatively, the temperature adjustment process may be performed separately from a replica exchange process after all the replica exchange processes are completed with respect to the annealing units 10-1 through 10-m.

In step S31, the temperature sequence number n is initialized to the value "1", for example. The replica exchange unit 31 may control this temperature sequence number n. In step S32, the temperature adjustment unit 32 receives the index L, $\beta_{n-1}$ through $\beta_{n+1}$, and $aveE_{n-1}$ through $aveE_{n+1}$. In step S33, the temperature adjustment unit 32 determines whether to perform temperature adjustment based on the sign check by the sign check unit 52. If temperature adjustment is not to be performed, the procedure proceeds to step S40. If temperature adjustment is to be performed, the procedure proceeds to step S34.

In step S34, the temperature adjustment unit 32 uses the exchange probability calculation unit 53 to calculate a probability $\beta_{n-1, n}$ of exchange between the annealing unit of the temperature sequence number n−1 and the annealing unit of the temperature sequence number n and also to calculate a probability $P_{n, n+1}$ of exchange between the annealing unit of the temperature sequence number n and the annealing unit of the temperature sequence number n+1. In step S35, the temperature adjustment unit 32 uses the shift direction determination unit 54 to determine whether the probability $P_{n, n+1}$ of exchange is greater than the probability $P_{n-1, n}$ of exchange. In the case of $P_{n, n+1} > P_{n-1, n}$, $\beta_n$ needs to be brought closer to $\beta_{n-1}$ in order to bring the two probabilities of exchange closer to each other, so that the procedure proceeds to step S36. In the case of $P_{n, n+1} < P_{n-1, n}$, $\beta_n$ needs to be brought closer to $\beta_{n+1}$ in order to bring the two probabilities of exchange closer to each other, so that the procedure proceeds to step S38. It may be noted that, as was previously described, the direction of $\beta_n$ adjustment may be determined by "A2: Direction Determination 1" and "A3: Direction Determination 2" of the previously described algorithm, without calculating probabilities of exchange themselves.

In step S36, the temperature adjustment unit 32 uses the shift calculation unit 62 to calculate the shift S based on the formula (6) previously described. In step S37, the temperature adjustment unit 32 uses the $\beta_n$ recalculation unit 63 to calculate $\beta_n + S$, thereby obtaining an updated value of $\beta_n$.

In step S38, the temperature adjustment unit 32 uses the shift calculation unit 62 to calculate the shift S based on the formula (7) previously described. In step S39, the temperature adjustment unit 32 uses the $\beta_n$ recalculation unit 63 to calculate $\beta_n - S$, thereby obtaining an updated value of $\beta_n$.

In step S40, a check is made as to whether the temperature sequence number n is the last temperature sequence number. The replica exchange unit 31 may perform this check. In the case that the number is not the last temperature sequence number, the replica exchange unit 31 in step S41 increments the temperature sequence number n. Thereafter, the procedure returns to step S32, from which the subsequent processes are repeated.

Figure 11:
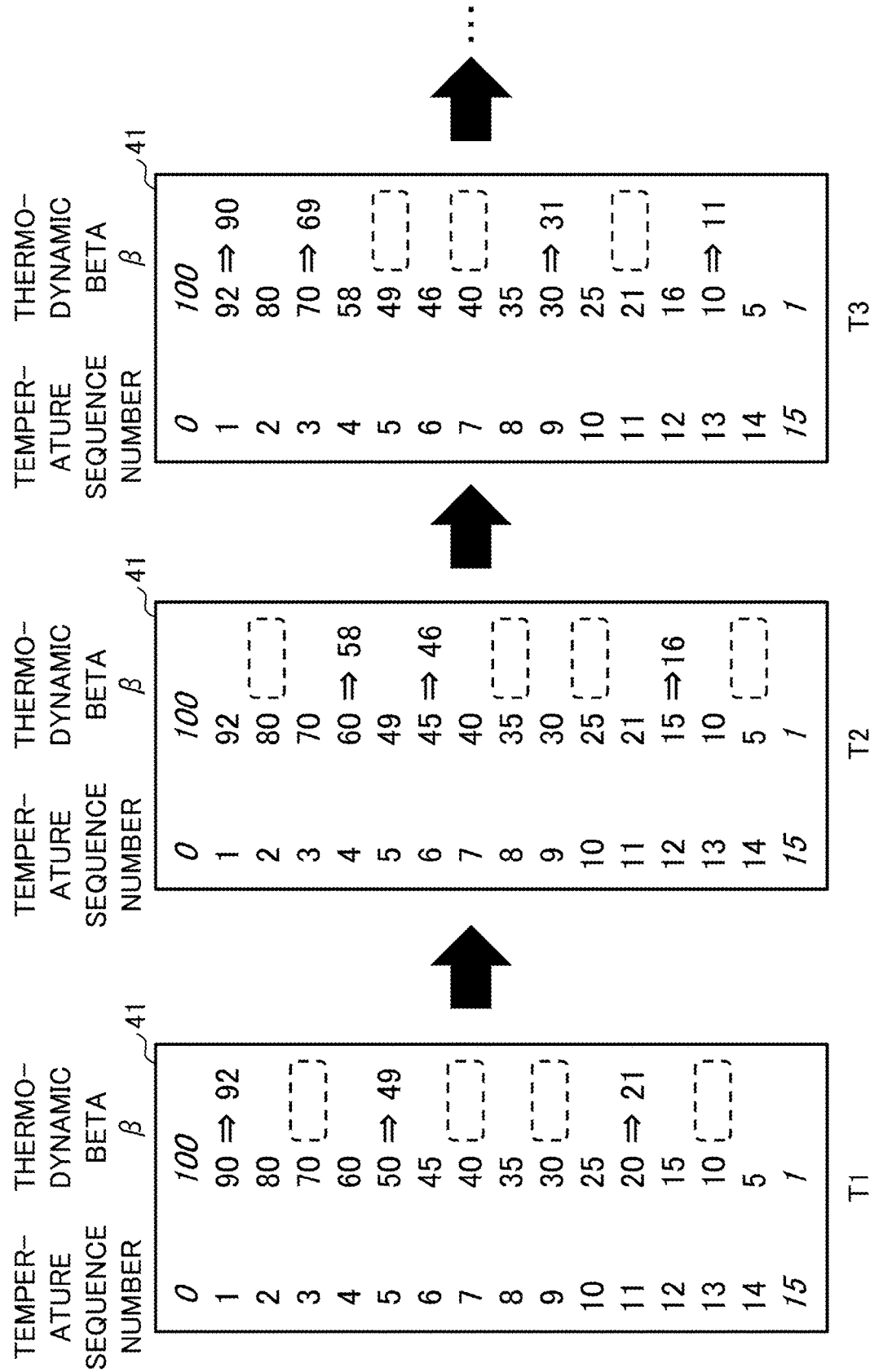
FIG. 11 is a drawing illustrating an example of the operation in which temperature adjustment with respect to odd-numbered temperature sequence numbers and temperature adjustment with respect to even-numbered temperature sequence numbers are alternately performed.

FIG. 11 is a drawing illustrating an example of the operation in which temperature adjustment with respect to odd-numbered temperature sequence numbers and temperature adjustment with respect to even-numbered temperature sequence numbers are alternately performed. FIG. 11 illustrates temperature adjustments in the temperature correspondence table 41 at timings T1 through T3 that are arranged in the order named from left to right. Temperature adjustment at the first round is illustrated in the temperature correspondence table 41 at timing T1. Following an annealing process and a replica exchange process that are thereafter performed, temperature adjustment at the second round is illustrated in the temperature correspondence table 41 at timing T2. Following an annealing process and a replica exchange process that are further performed, temperature adjustment at the third round is illustrated in the temperature correspondence table 41 at timing T3.

In the temperature adjustment at timing T1, for example, the thermodynamic betas corresponding to odd-numbered temperature sequence numbers are subjected to temperature adjustment. Specifically, the thermodynamic betas corresponding to the temperature sequence numbers 1, 5, and 11 are updated to new values. The thermodynamic betas corresponding to the temperature sequence numbers 3, 7, 9, and 13 do not satisfy the conditions required for temperature adjustment (i.e., "A1: Sign Check" of the previously described algorithm indicates no temperature adjustment). The thermodynamic betas are thus retained as they are, as indicted by open dashed-line rectangles.

In the temperature adjustment at timing T2, the thermodynamic betas corresponding to even-numbered temperature sequence numbers are subjected to temperature adjustment. Specifically, the thermodynamic betas corresponding to the temperature sequence numbers 4, 6, and 12 are updated to new values. The thermodynamic betas corresponding to the temperature sequence numbers 2, 8, 10, and 14 do not satisfy the conditions required for temperature adjustment (i.e., "A1: Sign Check" of the previously described algorithm indicates no temperature adjustment). The thermodynamic betas are thus retained as they are as indicted by open dashed-line rectangles.

The smallest temperature sequence number (i.e., "0" in this example) and the largest temperature sequence number (i.e., "15" in this example) are not subjected to temperature adjustment. Accordingly, the thermodynamic beta of the temperature sequence number "0" is retained at "100" in this example, and the thermodynamic beta of the temperature sequence number "15" is retained at "1" in this example.

The temperature adjustment illustrated in FIG. 11 is convenient when the temperature adjustment is performed in conjunction with a replica exchange process. In a replica exchange process, exchange is performed alternately with respect to the pairs starting at even numbers and with respect to the pairs starting at odd numbers. Accordingly, the control operation regarding temperature sequence numbers in the exchange process by the replica exchange unit 31 may be utilized as it is, to perform the control of temperature sequence numbers with respect to temperature adjustment. This arrangement enables efficient temperature adjustment.

FIG. 12 is a drawing illustrating an example of the operation in which temperature adjustment is performed with respect to all consecutive temperature sequence numbers. FIG. 12 illustrates temperature adjustments in the temperature correspondence table 41 at timings T1 through T3 that are arranged in the order named from left to right. Temperature adjustment at the first round is illustrated in the temperature correspondence table 41 at timing T1. Following an annealing process and a replica exchange process that are thereafter performed, temperature adjustment at the second round is illustrated in the temperature correspondence table 41 at timing T2. Following an annealing process and a replica exchange process that are further performed, temperature adjustment at the third round is illustrated in the temperature correspondence table 41 at timing T3.

In the temperature adjustment at timing T1, for example, the thermodynamic betas corresponding to the temperature sequence numbers 1, 4, 5, 6, 11, and 12 are updated to new values. The thermodynamic betas corresponding to the temperature sequence numbers 2, 3, 7, 8, 9, 10, 13, and 14 do not satisfy the conditions required for temperature adjustment. The thermodynamic betas are thus retained as they are, as indicted by open dashed-line rectangles. The smallest temperature sequence number and the largest temperature sequence number are not subjected to temperature adjustment as in the case illustrated in FIG. 11.

The temperature adjustment method illustrated in FIG. 12 offer an advantage over the method illustrated in FIG. 11 in that temperature adjustment is performed at finer intervals (i.e., half the intervals) with respect to temperature sequence numbers. The temperature adjustment method illustrated in FIG. 12, however, requires some consideration such as updating the thermodynamic betas at once after completing the thermodynamic beta adjustment process, or calculating and setting aside values for later computation such as probabilities of exchange for all the temperature sequence numbers in advance. The circuit size of the exchange control unit 11 may thus be slightly increased, compared with the case of the method illustrated in FIG. 11.

According to at least one embodiment, a mechanism that ensures sufficient exchange in the replica exchange method is provided for an optimization apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optimization apparatus comprising:
a plurality of annealing circuits configured to have respective states and respective temperatures differing from each other, to calculate respective evaluation function values responsive to the respective states, and to perform a state transition with probabilities responsive to the respective temperatures and the respective evaluation function values;
an exchange circuit configured to exchange the temperatures or the states between the plurality of annealing circuits with probabilities of exchange, a probability of exchange between two annealing circuits being calculated based on temperatures and evaluation function values of the two annealing circuits; and
a temperature adjustment circuit configured to change a post-exchange temperature of an annealing circuit of interest among the plurality of annealing circuits, the post-exchange temperature being a temperature immediately after exchange by the exchange circuit, such that a difference between the probability of exchange between the annealing circuit of interest and a first annealing circuit situated next thereto on a lower temperature side in a sequence arranged in order of temperature and the probability of exchange between the annealing circuit of interest and a second annealing circuit situated next thereto on a higher temperature side in the sequence arranged in order of temperature decreases,
each of the annealing circuits, the exchange circuit, and the temperature adjustment circuit are electronic circuits distinct from each other, and the annealing circuits are configured to operate in parallel to each other.

2. The optimization apparatus as claimed in claim 1, wherein the post-exchange temperature of the annealing circuit of interest is changed such that, based on average values of evaluation function values over a plurality of state transitions, the difference between the probability of exchange between the first annealing circuit and the annealing circuit of interest and the probability of exchange between the second annealing circuit and the annealing circuit of interest decreases.

3. The optimization apparatus as claimed in claim 1, wherein no change is caused to the post-exchange temperature of the annealing circuit of interest when either the probability of exchange between the first annealing circuit and the annealing circuit of interest or the probability of exchange between the second annealing circuit and the annealing circuit of interest is 1.

4. The optimization apparatus as claimed in claim 1, wherein with respect to the plurality of annealing circuits arranged in order of temperature, post-exchange temperature adjustment for even-numbered annealing circuits and post-exchange temperature adjustment for odd-numbered annealing circuits are alternately performed.

5. The optimization apparatus as claimed in claim 2, the evaluation function values and the average values are represented as fixed-point numbers, and a divisor for obtaining the average values is an exponentiation of 2, and wherein the average values of evaluation function values are calculated by addition, subtraction, and bit shifts of values represented as fixed-point numbers.

6. The optimization apparatus as claimed in claim 1, wherein a size of a change in thermodynamic beta for changing the post-exchange temperature of the annealing circuit of interest is proportional to a difference between a thermodynamic beta of the annealing circuit of interest and a thermodynamic beta of the first annealing circuit or the second annealing circuit.

7. The optimization apparatus as claimed in claim 1, wherein a size of a change in thermodynamic beta for changing the post-exchange temperature of the annealing circuit of interest is a value obtained by dividing, by an exponentiation of 2, a difference between a thermodynamic beta of the annealing circuit of interest and a thermodynamic beta of the first annealing circuit or the second annealing circuit, and wherein the thermodynamic beta is represented as a floating-point number, and a change in the post-exchange temperature of the annealing circuit of interest is calculated by addition and subtraction of values represented as floating-point numbers and subtraction of exponents thereof.

8. A method of performing simulated annealing in an optimization apparatus which includes a plurality of annealing circuits, an exchange circuit, and a temperature adjustment circuit, each of the annealing circuits, the exchange circuit, and the temperature adjustment circuit being electronic circuits distinct from each other, and the annealing circuits being configured to operate in parallel to each other, the method comprising:

causing the plurality of annealing circuits having respective states and respective temperatures differing from each other to calculate respective evaluation function values responsive to the respective states, and to perform a state transition with probabilities responsive to the respective temperatures and the respective evaluation function values;

exchanging, by the exchange circuit, the temperatures or the states between the plurality of annealing circuits with probabilities of exchange, a probability of exchange between two annealing circuits being calculated based on temperatures and evaluation function values of the two annealing circuits; and changing, by the temperature adjustment circuit, a post-exchange temperature of an annealing circuit of interest among the plurality of annealing circuits, the post-exchange temperature being a temperature immediately after exchange by the exchange circuit, such that a difference between the probability of exchange between the annealing circuit of interest and a first annealing circuit situated next thereto on a lower temperature side in a sequence arranged in order of temperature and the probability of exchange between the annealing circuit of interest and a second annealing circuit situated next thereto on a higher temperature side in the sequence arranged in order of temperature decreases.

* * * * *